United States Patent
Waters et al.

(10) Patent No.: US 7,974,334 B2
(45) Date of Patent: Jul. 5, 2011

(54) SYSTEMS AND METHODS FOR HYBRID-MIMO EQUALIZATION

(75) Inventors: Deric W. Waters, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 744 days.

(21) Appl. No.: 12/022,307

(22) Filed: Jan. 30, 2008

(65) Prior Publication Data

US 2008/0181322 A1 Jul. 31, 2008

Related U.S. Application Data

(60) Provisional application No. 60/887,254, filed on Jan. 30, 2007.

(51) Int. Cl.
*H03H 7/30* (2006.01)
*H03H 7/40* (2006.01)
*H03K 5/159* (2006.01)

(52) U.S. Cl. ........................................... 375/229

(58) Field of Classification Search .................. 375/147, 375/148, 229, 260, 262, 267, 295, 296, 326, 375/340, 347, 348, 350; 370/204, 209, 310, 370/315, 335, 343, 441, 442
See application file for complete search history.

(56) References Cited

U.S. PATENT DOCUMENTS

| | | | | |
|---|---|---|---|---|
| 5,642,382 A * | 6/1997 | Juan | | 375/232 |
| 2004/0181419 A1* | 9/2004 | Davis et al. | | 705/1 |
| 2005/0094742 A1* | 5/2005 | Yee | | 375/267 |
| 2005/0170802 A1* | 8/2005 | Oh et al. | | 455/226.1 |
| 2006/0085497 A1* | 4/2006 | Sehitoglu | | 708/405 |
| 2006/0109891 A1* | 5/2006 | Guo et al. | | 375/147 |
| 2006/0188008 A1* | 8/2006 | Pan et al. | | 375/148 |
| 2006/0251164 A1* | 11/2006 | Visoz et al. | | 375/233 |
| 2006/0280255 A1* | 12/2006 | Hongming et al. | | 375/260 |
| 2007/0025392 A1* | 2/2007 | Moorti et al. | | 370/465 |
| 2007/0081582 A1* | 4/2007 | Ginis et al. | | 375/222 |
| 2007/0121764 A1* | 5/2007 | Chen et al. | | 375/340 |
| 2007/0263744 A1* | 11/2007 | Mostafa | | 375/267 |

OTHER PUBLICATIONS

Barry, J. R. et al.; Digital Communication, 3rd Ed.; 2004; pp. 517-521; Chpt. 10, Kluwer Academic Publishers.

(Continued)

*Primary Examiner* — Dac V Ha
*Assistant Examiner* — Syed Haider
(74) *Attorney, Agent, or Firm* — Steven A. Shaw; W. James Brady; Frederick J. Telecky, Jr.

(57) ABSTRACT

Embodiments provide systems and methods for a novel multiple-input multiple-output (MIMO) equalization technique that produces a channel matrix that contains partly real coefficients and partly complex coefficients, referred to herein as a hybrid-MIMO equalization. MIMO detectors can exploit the hybrid-MIMO equalization to reduce complexity. Some embodiments provide systems and methods for equalizing a communication channel comprising receiving as an input a channel output vector, dividing the input into two vectors, a first vector that remains a complex number and a second vector that contains only real numbers, separating the second vector into its real and imaginary components, and regrouping the first and second vectors into a hybrid channel output vector that contains both real and complex coefficients.

20 Claims, 2 Drawing Sheets

OTHER PUBLICATIONS

Chan A. and Lee, I., "A new reduced-complexity sphere decoder for multiple antenna systems," IEEE Conference on Communications, 2002, pp. 460-464.

Damien, M. O. et al.; "On maximum-likelihood detection and the search for the closest lattice point;" IEEE Trans. on Info. Theory; Oct. 2003; pp. 2389-2402; vol. 49, No. 10.

Foschini, G. J. et al.; "Simplified processing for wireless communication at high spectral efficiency;" IEEE J. Selected Areas in Communication; 1999; pp. 1841-1852; vol. 17, No. 11.

Hochwald, B. M. and ten Brink, S.; "Achieving Near-Capacity on a Multiple-Antenna Channel;" IEEE Trans. on Comm.; Mar. 2003; pp. 389-399; vol. 51, No. 3.

Schnorr, C. P. and Euchner, M.; -Euchner "Lattice Basis Reduction: Improved Practical Algorithms and Solving Subset Sum Problems" Math. Programming, 1994, pp. 181-191, vol. 66.

Waters, D. W.; "Signal Detection Strategies and Algorithms for Multiple-Input Multiple-Output Channels;" Georgia Institute of Technology; PhD Dissertation; Dec. 2005; available at http://etd.gatech.edu.

Wubben, W. et al.; "Efficient algorithm for decoding layered space-time codes;" Electronic Letters; Oct. 2001; pp. 1348-1350; vol. 37, No. 22.

Zhao W. and Giannakis, G. B.; "Sphere decoding algorithms with improved radius search," IEEE Communications and networking Conference, Mar. 2004, p. 2290-2294, p. 2290-2294, vol. 48.

* cited by examiner

SYSTEMS AND METHODS FOR HYBRID-MIMO EQUALIZATION

CROSS-REFERENCE TO RELATED APPLICATIONS

The present application claims priority to U.S. provisional patent application Ser. No. 60/887,254, filed Jan. 30, 2007, and entitled "Hybrid-MIMO Equalization", hereby incorporated herein by reference.

BACKGROUND

As consumer demand for high data rate applications, such as streaming video, expands, technology providers are forced to adopt new technologies to provide the necessary data rates. Multiple Input Multiple Output ("MIMO") is an advanced radio system that employs multiple transmit antennas and multiple receive antennas to simultaneously transmit multiple parallel data streams. Relative to previous wireless technologies, MIMO enables substantial gains in both system capacity and transmission reliability without requiring an increase in frequency spectrum resources.

MIMO systems exploit differences in the paths between transmit and receive antennas to increase data throughput and diversity. As the number of transmit and receive antennas is increased, the capacity of a MIMO channel increases linearly, and the probability of all sub-channels between the transmitter and receiver fading simultaneously decreases exponentially. As might be expected, however, there is a price associated with realization of these benefits. Recovery of transmitted information in a MIMO system becomes increasingly complex with the addition of transmit antennas.

Many multiple-input multiple-output (MIMO) detection algorithms have been proposed in the literature. The optimal algorithm is conceptually simple, but is often impractical because its complexity increases exponentially with the number of channel inputs. As a result, algorithms have been proposed to solve the problem with less complexity, with the unfortunate effect of also significantly sacrificing performance.

Many MIMO detectors have been proposed and implemented. A summary of many MIMO detectors may be found in D. W. Waters, "Signal Detection Strategies and Algorithms for multiple-Input Multiple-Output Channels", Georgia Institute of Technology, PhD dissertation, December 2005, including many variations of the sphere decoding detector that minimize complexity without sacrificing performance. The sphere decoding detector is notable because it can achieve Max-Log (ML) performance in an uncoded system with much less complexity on average. At least one sphere decoding detector computes the log-likelihood ratio (LLR) for a channel input. Unfortunately, modeling a sphere detector is still quite complex, requiring significant processing resources.

Improvements are desired to achieve a favorable performance-complexity trade-off compared to existing MIMO detectors.

BRIEF DESCRIPTION OF THE DRAWINGS

For a detailed description of exemplary embodiments of the invention, reference will be made to the accompanying drawings in which.

DETAILED DESCRIPTION

Figure 1:
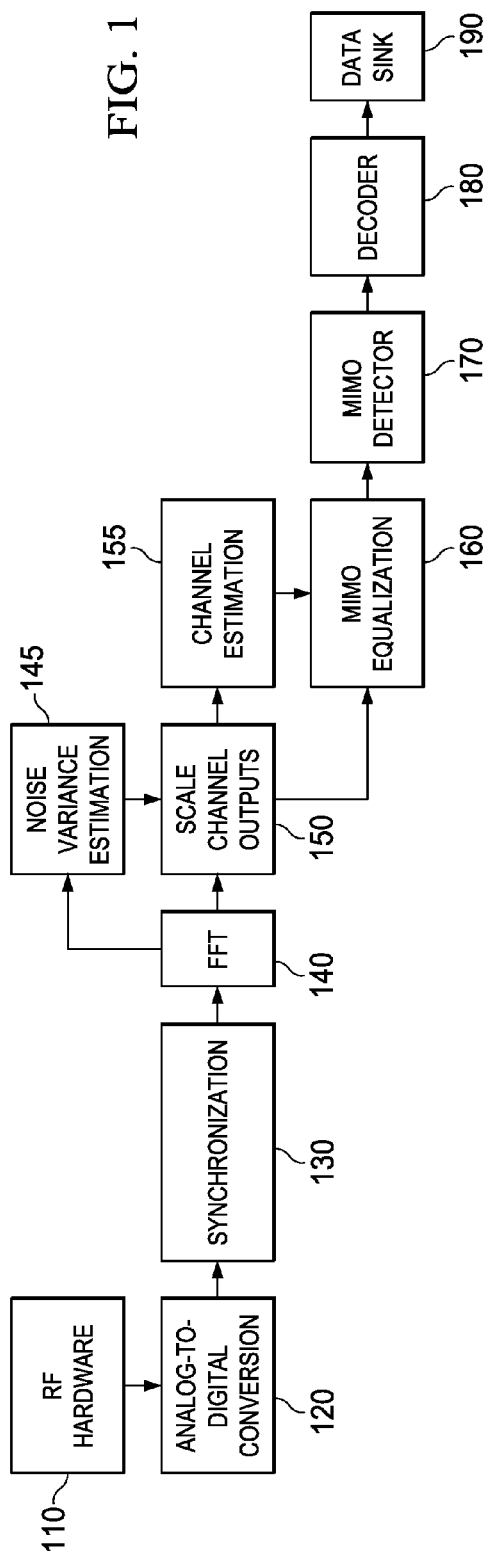
FIG. 1 illustrates a block diagram of an exemplary communication system comprising a MIMO equalizer.

It should be understood at the outset that although an exemplary implementation of one embodiment of the disclosure is illustrated below, embodiments may be implemented using any number of techniques, whether currently known or in existence. This disclosure should in no way be limited to the exemplary implementations, drawings, and techniques illustrated below, including the exemplary design and implementation illustrated and described herein, but may be modified within the scope of the appended claims along with their full scope of equivalents.

In light of the foregoing background, embodiments provide a novel multiple-input multiple-output (MIMO) equalization technique that produces a channel model containing partly real coefficients and partly complex coefficients. This new technique will hereinafter be referred to as hybrid-MIMO equalization. MIMO detectors can exploit embodiments of the effective channel model produced by this hybrid-MIMO equalization to reduce complexity.

Although embodiments will be described for the sake of simplicity with respect to wireless communication systems, it should be appreciated that embodiments are not so limited, and can be employed in a variety of communication systems.

To better understand embodiments of this disclosure, it should be appreciated that the MIMO detection problem - namely, to recover the channel inputs given the channel outputs when there are multiple inputs and outputs - can be described using a narrowband channel model written as:

$$r = Ha + w, \quad (1)$$

Where H is an M×N matrix, a is a signal vector such that $a = [a_1\ a_2\ \ldots\ a_N]^T$ is an N dimensional vector of symbols that may be drawn from different alphabets, and the noise has the autocorrelation matrix $E[ww^*] = \Sigma^2$. Although the present discussion focuses on the case where $\Sigma^2 = I\sigma^2$, it should be understood that embodiments are extendable to the more general case. As one example of this, and not by way of limitation, by applying a scaling operation the difference in noise variance among channel outputs is minimized so that the channel outputs may be processed more easily. See for example, patent application Ser. No. 12/022,927 entitled "SYSTEMS AND METHODS FOR SCALING TO EQUALIZE NOISE VARIANCE" filed concurrently with this application. It should be appreciated that embodiments discussed herein also apply to any system which can be considered to have at least one narrow-band channels (e.g., the individual tones in a MIMO-OFDM system may be considered to be a group of narrow-band channels).

One way to implement a MIMO detector begins with a QR decomposition (also known as a QR factorization) of the channel. One way this decomposition can be defined is as follows:

$$\begin{bmatrix} H \\ \alpha \hat{\sigma} I \end{bmatrix} \Pi = \begin{bmatrix} Q \\ \alpha \hat{\sigma} \Pi R^{-1} \end{bmatrix} R = \tilde{Q}R, \quad (2)$$

where $\tilde{Q}$ is an (M+N)×N matrix with orthonormal columns, R is an N×N triangular matrix with positive and real diagonals, Π is an N×N permutation matrix, and $\hat{\sigma}$ is an estimate of σ, and a is a chosen parameter, usually a non-negative real number. Although the present discussion describes embodiments assuming a lower triangular R matrix, it should be understood that embodiments can easily be extended to describe an upper triangular matrix instead. A common special case of the QR decomposition may be written as:

$$HΠ=QR, \quad (3)$$

when a=0. For the purposes of this discussion, a permutation matrix is a matrix that can be transformed into an identity matrix by some permutation of its columns.

The MIMO detector problem can be simplified by creating a triangularized channel matrix. One such method of triangularizing a channel uses the conjugate transpose of Q (resulting from the QR decomposition of the channel H) as follows:

$$y=Q^H r=Rs+n \quad (4)$$

where $s=Π^{-1}a=[s_1 \, s_2 \ldots s_N]^T$ is a permutation of the channel input vector, and n is an effective noise. Note that n may be a function of a when a≠0. This method of triangularizing the channel is also sometimes referred to as a whitened-matched filter (WMF). The constellation for the i-th symbol is defined as $s_i \in A_i$. The set of all valid channel inputs whose j-th bit in the i-th symbol maps to the value k is denoted as $A_1^N(k, i, j)$.

It should be understood that other kinds of channel triangularization are also possible. For example, an alternative implementation of the WMF that does not compute the matrix Q is defined as follows:

$$y=R^{-1}H^H R. \quad (5)$$

It should be understood that the matrix R for such a WMF may be computed from a Cholesky decomposition, LU decomposition of the channel matrix H, etc.

Regardless of the kind of channel triangularization employed, let the filter be represented by the matrix F. For embodiments discussed herein, the matrix F can be any matrix such that the matrix product R=FH is either lower- or upper- triangular. Lower-triangular means that the coefficient at the ith row and jth column of R is zero if i>j. upper-triangular means that the coefficient at the ith row and jth column of R is zero if i<j. Thus, two examples of the above-described matrix F are $F=R^{-1}H^H$ and $F=Q^H$.

To illustrate how channel triangularization may be used to implement a MIMO detector, consider a Max-Log (ML) MIMO detector. It will be appreciated that this example is solely for ease of understanding and should in no way be deemed a limitation of the scope of the disclosure or claims. The output of a ML detector is the log-likelihood ratio (LLR) of each bit transmitted in the vector s. The LLR value indicates the probability that a given bit was transmitted as a one or zero. The ML detector output for the j-th bit of the i-th symbol is described by a single equation:

$$\lambda_{i,j}=(\|r-HΠs^{(0)}\|^2-\|r-HΠs^{(1)}\|^2)/\hat{\sigma}^2, \quad (6)$$

where $\|r-HΠs^{(k)}\|^2$ is minimized under the constraint that $s^{(k)} \in A_1^N(k,i \, j)$. The value $\|r-HΠx\|^2$ is defined as the cost of the vector x.

If channel triangularization has been done, the ML detector may also be defined using the equivalent triangular channel model:

$$\lambda_{i,j}=(\|y-Rs^{(0)}\|^2-\|y-Rs^{(1)}\|^2)/\hat{\sigma}^2, \quad (7)$$

where $\|y-Rs^{(k)}\|^2$ is minimized subject to the constraints $s^{(k)} \in A_1^N(k, i, j)$, and where Π can be any permutation matrix. Note that $\|y-Rx\|^2=\|r-HΠx\|^2$ when a=0, otherwise if a≠0 there may be some performance loss. Computing the LLR values when the channel is triangular is often less complicated.

FIG. 1 is a block diagram of an exemplary communication system comprising a MIMO equalizer. Specifically, a wireless (e.g., radio frequency) stream of information is received at RF receiver (often implemented in hardware) 110, converted to a digital stream at analog-to-digital converter 120, and synchronized at 130. At this point the start of the packet has been located, and the digital stream is passed through a fast-Fourier transformation (FFT) at 140. It will be appreciated that this example is strictly for ease of understanding and should in no way limit the scope of the disclosure or claims. It will also be appreciated that analog-to-digital converter 120, synchronizer 130 and FFT 140 may be considered part of the processing system of the stream of information, and as such may comprise more or less processing functionality than set forth here in connection with the particular system of FIG. 1. The output of FFT 140 is provided to estimator 145 which estimates the noise variance of the stream. The outputs of FFT 140 and estimator 145 are provided to scaler 150 where the channel stream may be scaled, as needed, using the noise variance estimation on the transformed stream, and separated into components. For an example, and not by way of limitation, of a scaler 160, reference is made to "Scaling to Reduce Wireless Signal Detection Complexity", U.S. patent application Ser. No. 11/928,050, filed Oct. 30, 2007, hereby incorporated in its entirety herein by reference. The outputs of scaler 150 are fed to channel estimator 155 and to MIMO equalizer 160. Channel estimator 155 computes an estimate of the matrix H and provides that estimate to MIMO equalizer 160. MIMO equalizer 160, described in more detail below, provides a hybrid-equalized channel output and a hybrid-equalized channel matrix to MIMO detector 170. MIMO detector 170 generates LLR values for the transmitted bits which are in turn provided to decoder 180 for analysis. The output of decoder 180 is stored in data sink 190 which represents further processing the receiver may perform, for example it can be any form of memory now known or later developed.

It will be appreciated that it is possible to represent a complex channel model with only real variables through a transformation. Specifically, the following equation is equivalent to equation (1) (reference "Real versus complex-valued equalization in V-BLAST systems" IEEE Electronic Letters, vol. 39, no. 5, pp. 470-471, March 2003, by R. F. H Fischer and C. Windpassinger):

$$\begin{bmatrix} r_R \\ r_I \end{bmatrix} = \begin{bmatrix} H_R & -H_I \\ H_I & H_R \end{bmatrix} \begin{bmatrix} a_R \\ a_I \end{bmatrix} + \begin{bmatrix} w_R \\ w_I \end{bmatrix}, \quad (8)$$

where the subscripts R and I denote the real and imaginary coefficients, respectively, of the preceding matrix or vector. Any MIMO detector can operate using this real channel model by properly adapting the input symbol alphabet, taking the channel matrix to be the 2M×2N channel matrix $$\begin{bmatrix} H_R & -H_I \\ H_I & H_R \end{bmatrix},$$

taking the channel input to be the 2M×1 vector $$\begin{bmatrix} a_R \\ a_I \end{bmatrix},$$

and taking the channel output to be the 2M×1 vector $$\begin{bmatrix} r_R \\ r_I \end{bmatrix}.$$

For MIMO detectors there are sometimes benefits from using a real channel model, and sometimes benefits from using a complex channel model. For example, applying a sphere detector (see D. W. Waters dissertation, referenced above, for a description of this algorithm) to a real channel is simpler because the problem of sorting the symbols in the alphabet according to their Euclidean distance from a given point can be done very simply using, for example, Schnorr-Euchner enumeration ("Lattice basis reduction: Inproved practical algorithms and solving subset sum problems" Math. Programming, vol. 66, pp. 181-191, 1994, by C. P. Schnorr and M. Euchner). On the other hand, using a complex channel model decreases the channel dimensions and a simple slicing operation can be used to find the nearest symbol in an alphabet from a given point. Present embodiments make it possible to have the best of both of these worlds by generating a channel model that is a hybrid between the real and complex channel models. It should be understood that generating a channel model means that both an equalized channel output and an equalized channel matrix are generated. Embodiments of this hybrid MIMO equalization generate hybrid-equalized channel models on which MIMO detectors can operate. Generating a hybrid-equalized channel model means that both a hybrid-equalized channel output and a hybrid-equalized channel matrix are generated.

Figure 2:
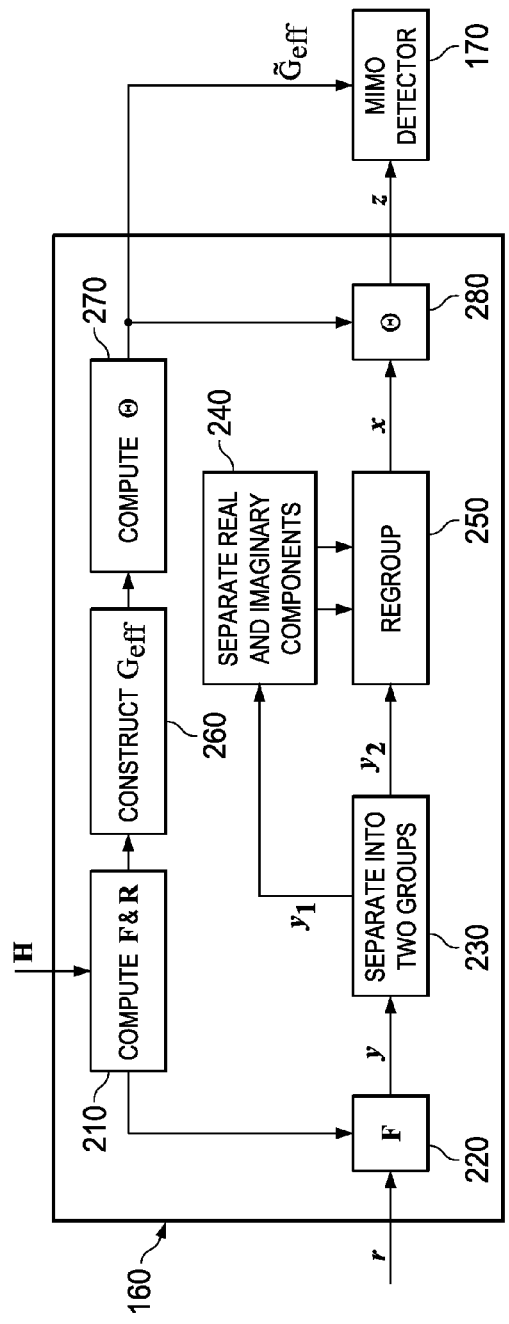
FIG. 2 illustrates a block diagram of an exemplary MIMO equalizer.

Turning now to FIG. 2, an embodiment of MIMO equalizer 160 is shown which generates a hybrid-equalized channel output that contains a mixture of both real and complex coefficients. This hybrid-equalized channel output may be viewed as the output of an effective channel, whose triangularized channel matrix is in turn provided to MIMO detector 170. Channel estimator 155 provides an estimation of channel matrix H to MIMO equalizer 160. At 210, MIMO equalizer 160 computes F and R matrices. At 220 MIMO equalizer 160 applies F to the channel output r received from scaler 150 to create a triangularized channel output. It should be appreciated that some embodiments will not apply F to the channel output for a variety reasons, e.g. F (such as a whitened-matched filter) was applied to the channel output before the channel output was provided as input to MIMO equalizer 160, etc. At 230 MIMO equalizer 160 begins the process of generating a hybrid-equalized channel output that contains both real and complex coefficients by separating the channel output into two groups: one group where the vector(s) contain g elements each (referred to in this discussion as $y_1$), and another group where the vector(s) contain N-g elements (referred to in this discussion as $y_2$). At 240, $y_1$ is separated into real and imaginary components, $y^R_1$ and $y^I_1$, respectively. It should be understood at this point that although $y_2$ still represents a vector of complex numbers, $y^R_1$ and $y^I_1$ both represent vectors of only real numbers. At 250, $y^R_1$, $y^I_1$, and $y_2$ are regrouped and treated as a single vector, x. Alternatively, the F and R matrices may be input to 210 instead of calculating them from the matrix H if the F and R matrices have already been computed elsewhere in the system.

The main goal of embodiments of hybrid equalization is to create an effective channel that has some real inputs and some complex inputs from a channel which has only complex inputs. Embodiments triangularize the channel; one way to accomplish this, and not by way of limitation, would be use apply a WMF. The triangularized channel output is separated and regrouped to create a hybrid channel output—"hybrid" in the sense that it corresponds to a channel with some real inputs and some complex inputs. The hybrid channel matrix corresponding to this hybrid channel output may or may not be triangular. An unitary rotation matrix is applied to the hybrid channel output to create a hybrid-equalized channel output which corresponds to a channel with some real inputs and some complex inputs. The hybrid-equalized channel matrix corresponding to this hybrid-equalized channel output is triangular. For brevity, the generation of a hybrid-equalized channel matrix and a hybrid-equalized channel output may be referred to herein as generation of a hybrid channel model.

Another way of thinking of embodiments of hybrid equalization would be as follows. The channel is triangularized; for example, the WMF of equation (3) can be used. The triangularized channel outputs are separated and regrouped. The triangularized channel output y can be divided into two vectors:

$$y_1 = [G_1\ 0]a_1 + n_1, \quad (9)$$

$$y_2 = [G_x\ G_2]a_2 + n_2, \quad (10)$$

where $$R = \begin{bmatrix} G_1 & 0 \\ G_X & G_2 \end{bmatrix},$$

where the vectors $y_1$, $a_1$, and $n_1$ contain g elements each, and the vectors $y_2$, $a_2$, and $n_2$ contain N-g elements each. At this time, the channel inputs $a_1$ and $a_2$ are still complex. Equation (9) can be divided into two equations and rewritten as:

$$y_1^R = [G_1^R\ -G_1^I\ 0] \begin{bmatrix} a_1^R \\ a_1^I \\ a_2 \end{bmatrix} + n_1^R, \quad (11)$$

$$y_1^I = [G_1^I\ G_1^R\ 0] \begin{bmatrix} a_1^R \\ a_1^I \\ a_2 \end{bmatrix} + n_1^I, \quad (12)$$

where the subscripts R and I denote the real and imaginary coefficients, respectively, of the preceding matrix or vector. The vector $[a_1^R\ a_1^I\ a_2]^T$ is the new effective channel input. Note that $[a_1^R\ a_1^I\ a_2]^T$ has 2 g real coefficients and N-g complex coefficients, so it is a hybrid channel input. The vector $y_2$ from Equation (10) can be rewritten in terms of the hybrid channel input as follows:

$$y_2 = [G_X\ jG_X\ G_2] \begin{bmatrix} a_1^R \\ a_1^I \\ a_2 \end{bmatrix} + n_2. \quad (13)$$

By regrouping the vectors $y_1^R$, $y_1^I$, and $y_2$ the hybrid channel output, x, is described by the following equation:

$$x = \begin{bmatrix} y_1^R \\ y_1^I \\ y_2 \end{bmatrix} = \begin{bmatrix} G_1^R & -G_1^I & 0 \\ G_1^I & G_1^R & 0 \\ G_X & jG_X & G_2 \end{bmatrix} \begin{bmatrix} a_1^R \\ a_1^I \\ a_2 \end{bmatrix} + \begin{bmatrix} n_1^R \\ n_1^I \\ n_2 \end{bmatrix}. \quad (14)$$

The hybrid channel matrix is defined as:

$$G_{\textit{eff}} = \begin{bmatrix} G_1^R & -G_1^I & 0 \\ G_1^I & G_1^R & 0 \\ G_X & jG_X & G_2 \end{bmatrix}. \quad (15)$$

Lastly, the hybrid channel is triangularized, so that its channel matrix is triangular. This third step is preferable when $G_1^I$ has some non-zero coefficients, i.e. for the cases where $G_{\textit{eff}}$ is not a triangular matrix. There exist many unitary rotation matrices $\Theta$ such that $\tilde{G}_{\textit{eff}} = \Theta G_{\textit{eff}}$ is triangular. There are many ways to compute such a matrix $\Theta$ and the resulting matrix $\tilde{G}_{\textit{eff}}$. For example, the conjugate transpose of the Q matrix from a QR decomposition of $G_{\textit{eff}}$ results in the matrix $\Theta = Q^H$. Returning to the example embodiment of FIG. 2, at 260 an effective hybrid channel matrix, $G_{\textit{eff}}$, is constructed. At 270 MIMO equalizer 160 uses $G_{\textit{eff}}$ to compute matrix $\Theta$ and to generate hybrid-equalized channel matrix $\tilde{G}_{\textit{eff}}$. The resulting hybrid-equalized channel matrix $\tilde{G}_{\textit{eff}}$ is provided to MIMO detector 170.

At 280, MIMO equalizer 160 applies the matrix $\Theta$ to the hybrid channel output by left multiplying x by the matrix $\Theta$:

$$z = \begin{bmatrix} z_1 \\ z_2 \end{bmatrix} = \Theta x = \tilde{G}_{\textit{eff}} \begin{bmatrix} a_1^R \\ a_1^I \\ a_2 \end{bmatrix} + \Theta \begin{bmatrix} n_1^R \\ n_1^I \\ n_2 \end{bmatrix}. \quad (16)$$

The vector z is the hybrid-equalized channel output because its corresponding channel input has 2 g real inputs and N-g complex inputs. This hybrid-equalized channel output z and the hybrid-equalized channel matrix $\tilde{G}_{\textit{eff}}$ are then provided to MIMO detector 170 to simplify detection.

Figure 3:
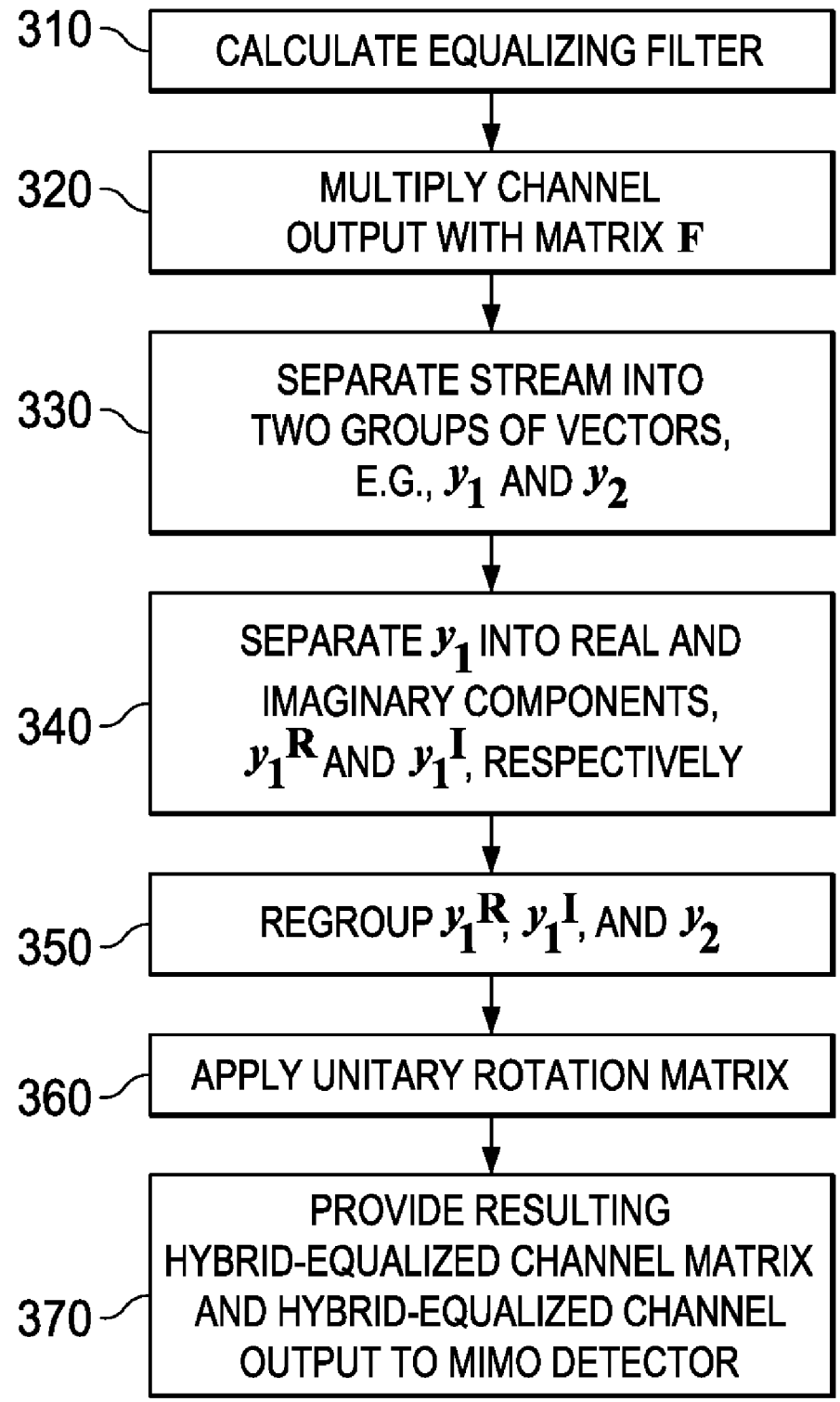
FIG. 3 illustrates a method embodiment of an exemplary MIMO equalizer creating a hybrid channel model containing partly real coefficients and partly complex coefficients.

FIG. 3 illustrates a method embodiment for generating a hybrid-equalized channel output and a hybrid-equalized channel matrix according to the present disclosure, wherein the resulting effective channel input contains partly real coefficients and partly complex coefficients. The equalizing filter F with respect to matrix H is calculated (functions 310 and 320). The stream is separated into two vectors (function 330). At this point both vectors contain only complex coefficients. The first vector is separated into its real and imaginary components (function 340). The complex number vector (e.g., $y_2$) and the real number vectors (e.g., $y_1^R$ and $y_1^I$) are regrouped at function 350 and treated as a single vector for purposes of further processing. When the resulting hybrid channel matrix is not triangular, a unitary rotation matrix is applied (function 360) to triangularize the resulting hybrid channel matrix. The resulting hybrid-equalized channel output and channel matrix are provided to MIMO detector at function 370.

The following are illustrations of channel matrices that result from application of hybrid MIMO equalizer 160 to simple channels. It will be appreciated that application of hybrid MIMO equalizer 160 can be readily made to larger channels, and that the following illustrations are for the sake of simplicity, and not by way of limitation. In these examples, $g_{i,j}$ are real coefficients.

Example 1a:

2×2 channel, where $g = 1, N = 2$:

$$G_{\textit{eff}} = \begin{bmatrix} g_{1,1} & 0 & 0 \\ 0 & g_{1,1} & 0 \\ g_{2,1} & jg_{2,1} & g_{2,2} \end{bmatrix} \quad \tilde{G}_{\textit{eff}} = G_{\textit{eff}}$$

Example 1b:

2×2 channel, where $g = 2, N = 2$:

$$G_{\textit{eff}} = \begin{bmatrix} g_{1,1} & 0 & 0 & 0 \\ g_{2,1}^R & g_{2,2} & -g_{2,1}^I & 0 \\ 0 & 0 & g_{1,1} & 0 \\ g_{2,1}^I & 0 & g_{2,1}^R & g_{2,2} \end{bmatrix}$$

$$\tilde{G}_{\textit{eff}} = \begin{bmatrix} g_{1,1} & 0 & 0 & 0 \\ x_1 & x_2 & 0 & 0 \\ x_3 & x_4 & x_5 & 0 \\ g_{2,1}^I & 0 & g_{2,1}^R & g_{2,2} \end{bmatrix}$$

$$\Theta = \begin{bmatrix} 1 & 0 & 0 & 0 \\ 0 & g_{1,1}/d & g_{2,1}^I/d & 0 \\ 0 & -g_{2,1}^I/d & g_{1,1}/d & 0 \\ 0 & 0 & 0 & 1 \end{bmatrix}, d = \sqrt{(g_{2,1}^I)^2 + g_{2,1}^2}$$

Example 2a:

3×3 channel, where $g = 2, N = 3$:

$$G_{\textit{eff}} = \begin{bmatrix} g_{1,1} & 0 & 0 & 0 & 0 \\ g_{2,1}^R & g_{2,2} & -g_{2,1}^I & 0 & 0 \\ 0 & 0 & g_{1,1} & 0 & 0 \\ g_{2,1}^I & 0 & g_{2,1}^R & g_{2,2} & 0 \\ g_{3,1} & g_{3,2} & jg_{3,1} & jg_{3,2} & g_{3,3} \end{bmatrix}$$

$$\tilde{G}_{\textit{eff}} = \begin{bmatrix} g_{1,1} & 0 & 0 & 0 & 0 \\ x_1 & x_2 & 0 & 0 & 0 \\ x_3 & x_4 & x_5 & 0 & 0 \\ g_{2,1}^I & 0 & g_{2,1}^R & g_{2,2} & 0 \\ g_{3,1} & g_{3,2} & jg_{3,1} & jg_{3,2} & g_{3,3} \end{bmatrix}$$

$$\Theta = \begin{bmatrix} 1 & 0 & 0 & 0 & 0 \\ 0 & g_{1,1}/d & g_{2,1}^I/d & 0 & 0 \\ 0 & -g_{2,1}^I/d & g_{1,1}/d & 0 & 0 \\ 0 & 0 & 0 & 1 & 0 \\ 0 & 0 & 0 & 0 & 1 \end{bmatrix}, d = \sqrt{(g_{2,1}^I)^2 + g_{2,1}^2}$$

Example 2b:

3×3 channel, where $g = 1, N = 3$:

-continued $$G_{eff} = \begin{bmatrix} g_{1,1} & 0 & 0 & 0 \\ 0 & g_{1,1} & 0 & 0 \\ g_{2,1} & jg_{2,1} & g_{2,2} & 0 \\ g_{3,1} & jg_{3,1} & g_{3,2} & g_{3,3} \end{bmatrix} \tilde{G}_{eff} = G_{eff}$$

The above discussion is meant to be illustrative of the principles and various embodiments of the disclosure. Many modifications and other embodiments will come to mind to one skilled in the art having the benefit of the teachings presented in the foregoing descriptions, and the associated drawings. Therefore, it is to be understood that the following claims are not to be limited to the specific embodiments disclosed. Although specific terms are employed herein, they are used in a generic and descriptive sense only and not for purposes of limitation.

What is claimed is:

1. A system for equalizing multiple input-multiple output (MIMO) channels, comprising:
   a MIMO equalizer that
   receives a channel output vector input (r),
   multiplies the channel output vector by a matrix F generating a triangularized channel output vector (y),
   divides the input into two complex vectors, a first complex vector (y2) and a second complex vector (y1),
   separates the second complex vector into its real and imaginary components (y1R and y1I), and
   regroups the first and second complex vectors to generate a hybrid channel output vector $$\left( \begin{bmatrix} y_1^R \\ y_1^I \\ y_2 \end{bmatrix} \right)$$

containing both real and complex
   coefficients and a hybrid channel matrix $$\left( \begin{bmatrix} G_1^R & -G_1^I & 0 \\ G_1^I & G_1^R & 0 \\ G_X & jG_X & G_2 \end{bmatrix} \right)$$

such that $$\begin{bmatrix} y_1^R \\ y_1^I \\ y_2 \end{bmatrix} = \begin{bmatrix} G_1^R & -G_1^I & 0 \\ G_1^I & G_1^R & 0 \\ G_X & jG_X & G_2 \end{bmatrix} \begin{bmatrix} a_1^R \\ a_1^I \\ a_2 \end{bmatrix} + \begin{bmatrix} n_1^R \\ n_1^I \\ n_2 \end{bmatrix},$$

where a is signal vector, n is noise vector and where the subscripts R and I denote the real and imaginary coefficients, respectively, of the preceding matrix or vector.

2. The system of claim 1, wherein the MIMO equalizer passes the hybrid channel output vector to $$\left( \begin{bmatrix} y_1^R \\ y_1^I \\ y_2 \end{bmatrix} \right)$$

a MIMO detector.

3. The system of claim 1, wherein the MIMO equalizer receives a channel matrix input (H).

4. The system of claim 1, wherein the MIMO equalizer passes a corresponding effective hybrid-equalized channel matrix $$\left( \begin{bmatrix} G_1^R & -G_1^I & 0 \\ G_1^I & G_1^R & 0 \\ G_X & jG_X & G_2 \end{bmatrix} \right)$$

to a MIMO detector.

5. The system of claim 1, wherein the MIMO equalizer triangularizes the hybrid channel output vector before passing a resulting hybrid-equalized channel output vector to a MIMO detector.

6. The system of claim 1, wherein the MIMO equalizer triangularizes the hybrid channel output vector by applying an unitary rotation matrix.

7. The system of claim 6, wherein the unitary rotation matrix is computed from a QR decomposition of a corresponding effective hybrid channel matrix.

8. The system of claim 1, wherein the MIMO equalizer further computes an unitary rotation matrix.

9. The system of claim 8, wherein the unitary rotation matrix is computed from a QR decomposition of a corresponding effective hybrid channel matrix.

10. A method for equalization of a communication channel, comprising:
    receiving as an input to a multiple input-multiple output (MIMO) equalizer a channel output vector(r);
    multiplying the channel output vector by a matrix F generating a triangularized channel output vector (y);
    dividing the input into two vectors, a first vector and a second vector;
    separating the second vector into its real and imaginary components; and
    regrouping the first and second vectors into a hybrid channel output vector that contains both real and complex coefficients; and generating a hybrid channel $$\left( \begin{bmatrix} G_1^R & -G_1^I & 0 \\ G_1^I & G_1^R & 0 \\ G_X & jG_X & G_2 \end{bmatrix} \right)$$

matrix such that:

$$-\begin{bmatrix} y_1^R \\ y_1^I \\ y_2 \end{bmatrix} = \begin{bmatrix} G_1^R & -G_1^I & 0 \\ G_1^I & G_1^R & 0 \\ G_X & jG_X & G_2 \end{bmatrix} \begin{bmatrix} a_1^r \\ a_1^I \\ a_2 \end{bmatrix} + \begin{bmatrix} n_1^R \\ n_1^I \\ n_2 \end{bmatrix},$$

where a is signal vector, n is noise vector and where the subscripts R and I denote the real and imaginary coefficients, respectively, of the preceding matrix or vector.

11. The method of claim 10, further comprising triangularizing the hybrid channel output vector before passing a resulting hybrid-equalized channel output vector to a MIMO detector.

12. The method of claim 10, further comprising triangularizing the hybrid channel output vector by applying a unitary rotation matrix.

13. The method of claim 12, further comprising applying a unitary rotation matrix computed from a decomposition of a corresponding effective hybrid channel matrix.

14. The method of claim 10, further comprising providing the hybrid channel output vector to a multiple input-multiple output (MIMO) detector.

15. The method of claim 10, further comprising providing a corresponding effective hybrid-equalized channel matrix to a multiple input-multiple output (MIMO) detector.

16. A communication system, comprising:
a receiver for receiving a stream of information including a channel output vector (r);
a processing system for digitizing the stream of information, preparing the stream for scaling, as needed, and estimating an effective channel matrix;
a multiple input-multiple output (MIMO) equalizer for generating at least one output that contains both real and complex coefficients, corresponding to an estimated effective hybrid-equalized channel matrix $$\left( \begin{bmatrix} G_1^R & -G_1^I & 0 \\ G_1^I & G_1^R & 0 \\ G_X & jG_X & G_2 \end{bmatrix} \right)$$

such that $$\begin{bmatrix} y_1^R \\ y_1^I \\ y_2 \end{bmatrix} = \begin{bmatrix} G_1^R & -G_1^I & 0 \\ G_1^I & G_1^R & 0 \\ G_X & jG_X & G_2 \end{bmatrix} \begin{bmatrix} a_1^r \\ a_1^I \\ a_2 \end{bmatrix} + \begin{bmatrix} n_1^R \\ n_1^I \\ n_2 \end{bmatrix},$$

where a is signal vector, n is noise vector and where the subscripts R and I denote the real and imaginary coefficients, respectively, of the preceding matrix or vector; and
a MIMO detector.

17. The communication system of claim 16, wherein the stream of information is a wireless stream of information.

18. The communication system of claim 16, wherein the MIMO equalizer triangularizes the at least one output before providing it to the MIMO detector.

19. The communication system of claim 16, wherein the MIMO equalizer triangularizes the at least one output by multiplying it with a unitary rotation matrix.

20. The communication system of claim 16, wherein the MIMO equalizer generates the at least one output by dividing a channel output vector into two vectors, a first vector that remains a complex number and a second vector that contains only real numbers, separates the second vector into its real and imaginary components, and regroups the first and second vectors as the output.

\* \* \* \* \*